Sept. 29, 1931. J. MOUCHLY 1,824,830
VALVE AND VALVE GEAR FOR LOCOMOTIVES AND OTHER ENGINES
Filed Sept. 25, 1928 4 Sheets-Sheet 1
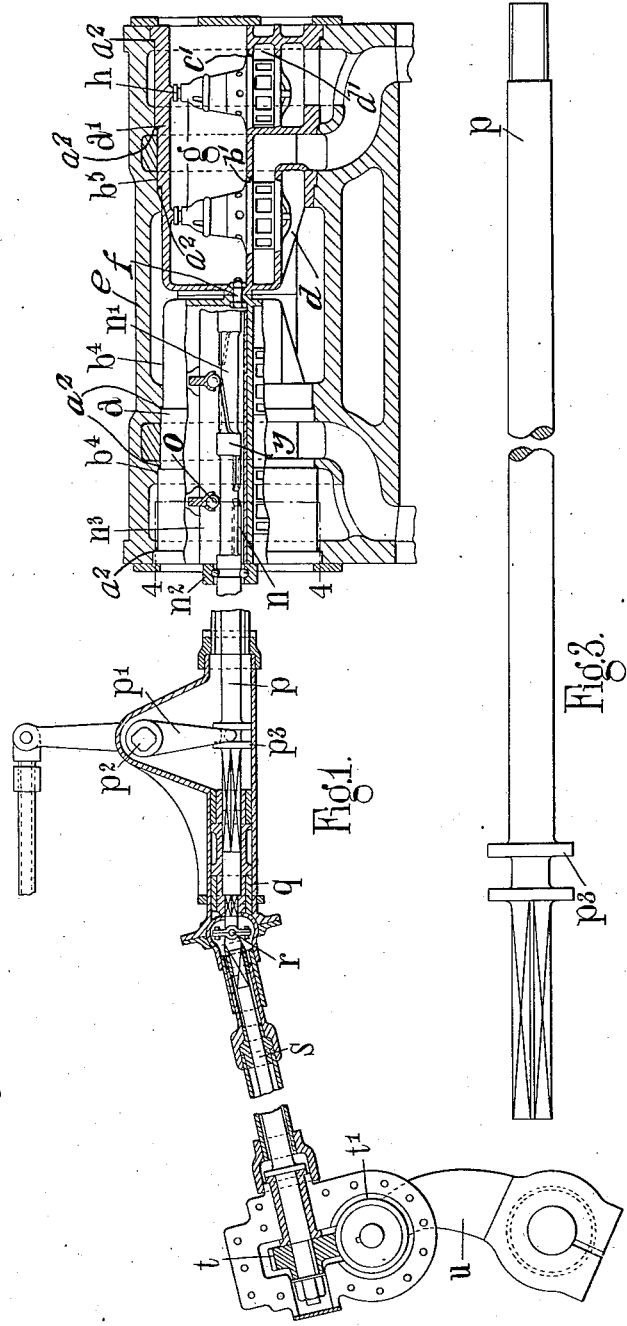

Sept. 29, 1931.　　　　J. MOUCHLY　　　　1,824,830
VALVE AND VALVE GEAR FOR LOCOMOTIVES AND OTHER ENGINES
Filed Sept. 25, 1928　　4 Sheets-Sheet 2
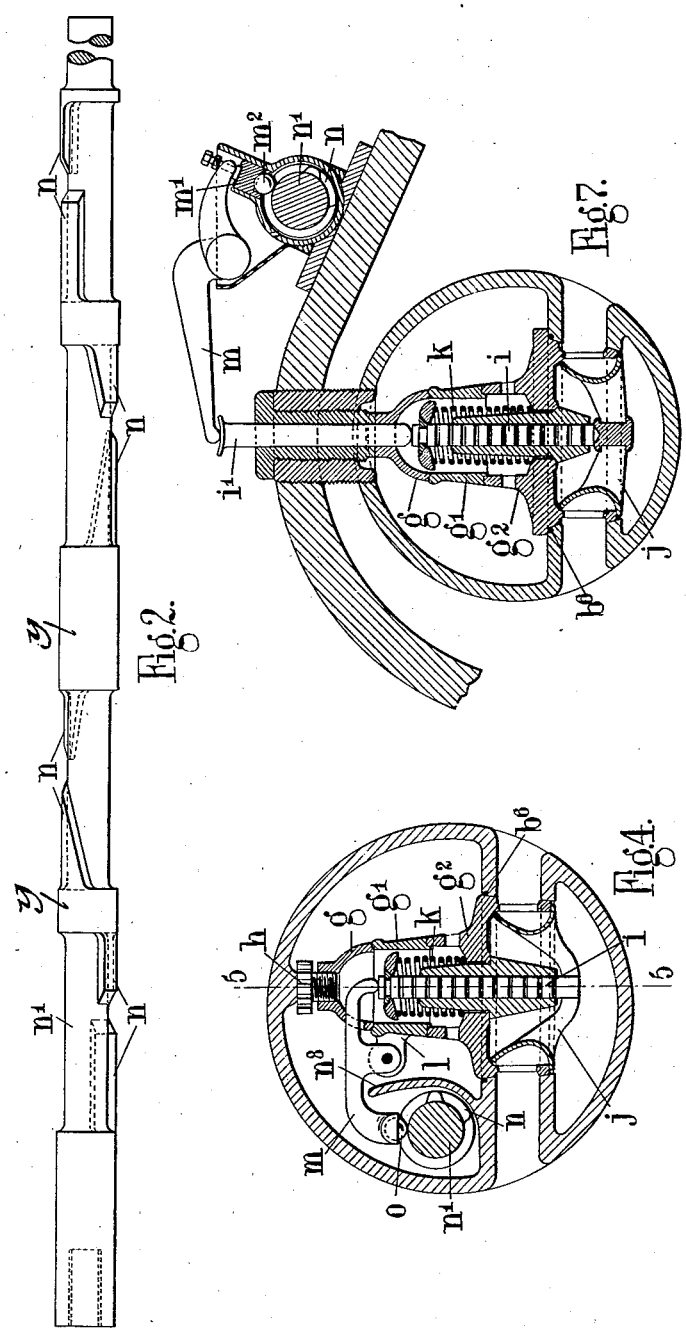
J. Mouchly
INVENTOR
By: Mark & Clerk
ATTYS.

Sept. 29, 1931.   J. MOUCHLY   1,824,830
VALVE AND VALVE GEAR FOR LOCOMOTIVES AND OTHER ENGINES
Filed Sept. 25, 1928    4 Sheets-Sheet 3

J. Mouchly
INVENTOR

By: Marks & Clerk
Attys.

Sept. 29, 1931.　　　　　J. MOUCHLY　　　　　1,824,830
VALVE AND VALVE GEAR FOR LOCOMOTIVES AND OTHER ENGINES
Filed Sept. 25, 1928　　4 Sheets-Sheet 4
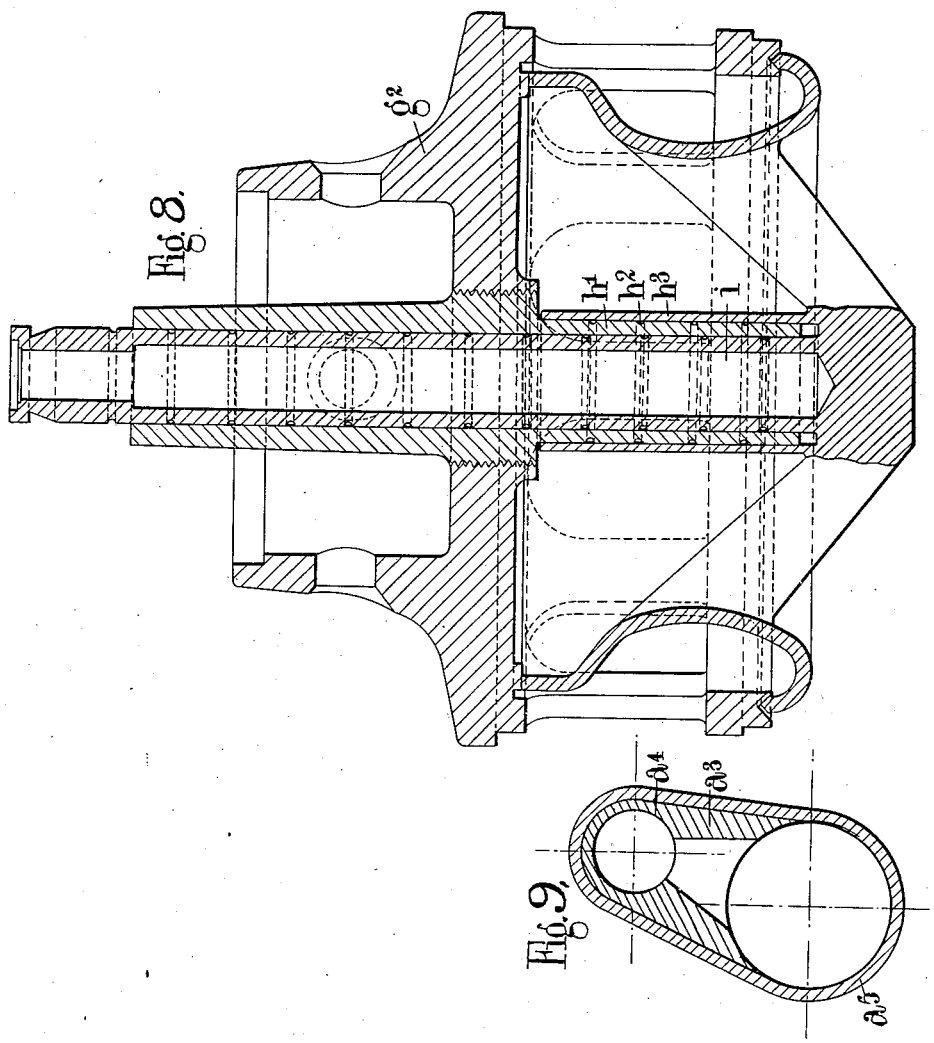

Patented Sept. 29, 1931

1,824,830

UNITED STATES PATENT OFFICE

JACQUES MOUCHLY, OF HAIFA, PALESTINE

VALVE AND VALVE GEAR FOR LOCOMOTIVES AND OTHER ENGINES

Application filed September 25, 1928, Serial No. 308,191, and in Great Britain January 13, 1928.

This invention relates to steam distribution valves and valve gear for locomotives.

Hitherto the substitution of poppet valves for piston or slide valves in locomotives has necessitated the replacement of the existing cylinders by others specially designed for use with poppet valves, and has thereby involved considerable expense.

The object of the present invention is to provide in steam locomotives a reliable poppet valve distribution gear of such a character that it may be used with cylinders originally designed for using piston or slide valves, that is to say, the invention enables cylinders having piston or slide valves to be re-conditioned so as to use poppet valves, or the existing patterns of the cylinders to be utilized so that the casting may be fitted with the improved poppet valve system.

The invention consists in a poppet valve steam distribution unit for locomotives, comprising a body part composed of one or more castings, independent of the cylinder, provided with seatings for the poppet valves and apertures for steam admission and exhaust, which valves are adapted to be actuated through transmission means by rotary cams rigid with an axially adjustable cam shaft, the arrangement being such that the unit is adaptable to the existing cylinders of locomotives and also to new cylinders having the existing design or specially altered to suit the purpose.

The steam distribution unit according to this invention is adaptable to both the right hand and left hand cylinders of locomotives, and the valves themselves or the component parts thereof are interchangeable throughout and are easily accessible, thus facilitating their manufacture by mass production.

In the accompanying drawings which illustrate, by way of example, various adaptations and modifications of the steam distribution unit constructed in accordance with this invention, and in which the same reference letters are utilized to indicate the same or analogous parts.

Figure 5:
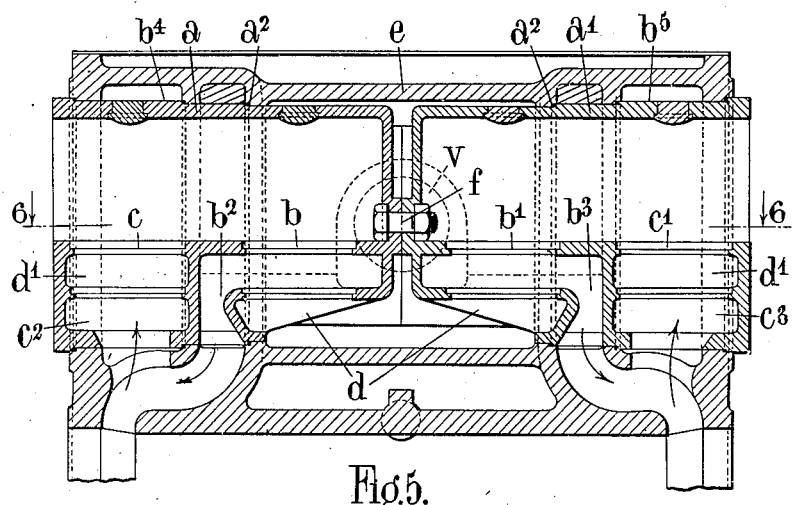
Figure 6:
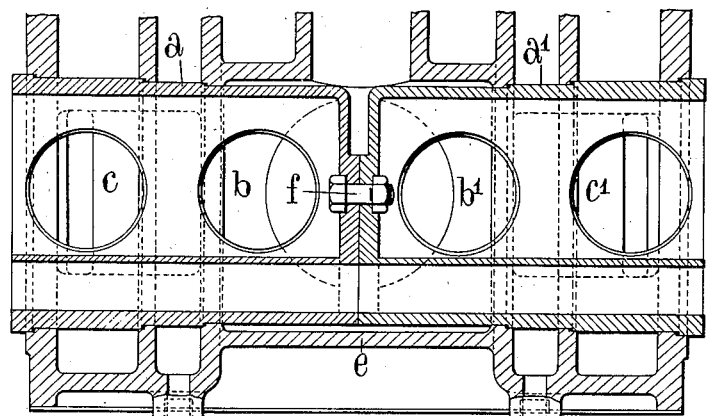

Figure 1 illustrates in sectional elevation a general arrangement of a form of the unit and the valve gear utilized in connection therewith, wherein the unit is shown as applied to a cylinder which would normally have a piston valve controlled by Walschaert gear, Figure 2 is an elevation of the cam shaft detached, and drawn to a larger scale than in Figure 1, Figure 3 is an elevation of the cam shaft extension to the same scale as in Figure 2, Figure 4 is a transverse section to an enlarged scale of the unit on the line 4—4 of Figure 1, Figure 5 is a longitudinal section on the line 5—5 of Figure 4 with the valves removed, Figure 6 is a longitudinal section on the line 6—6 of Figure 5, Figure 7 is a transverse section illustrating a modified form of the unit applied to a cylinder which would normally have a piston valve, Figure 8 is a detail view showing a modified form of a poppet valve forming a part of the unit constructed in accordance with this invention, Figure 9 is a diagrammatical view of a cylinder which would normally have a piston valve, showing a steam passage as restricted prior to the insertion of a unit according to this invention.

Referring now to Figures 1 to 6 of the drawings, the body part of the unit comprises two tubular castings $a$ and $a'$ provided respectively with transverse seatings $b$ and $b'$ for inlet valves and $c$ and $c'$ for exhaust valves. Steam inlet apertures $d$ and exhaust apertures $d'$ are also provided in the said castings which are positioned within the steam chest $e$ as hereinafter described and subsequently bolted together at $f$. Each valve is provided with a cage comprising a series of superposed elements $g$, $g'$ and $g^2$ adapted to be rigidly positioned co-axially with their valve seating in the body part of the unit by means of a set screw $h$. The screw-threaded shank of the set screw $h$ is adapted to engage a correspondingly screw-threaded aperture in the upper terminating element $g$ of the valve cage, and the head of the set screw is provided with a recess for cooperation with a projection on the inner peripheral surface of the body part of the unit to rigidly position the valve cage therein. Valve spindles $i$ are located within the valve cages, and the valve bodies $j$ rigid with the spindles are maintained in a closed position by the action of coil springs $k$ surrounding the said spindles and interposed between boss portions of the valve cages and caps rigid with the valve spindles. The elements $g'$ of the valve cages are provided with lugs $l$ pivotally supporting rockers $m$ for opening the valves against the action of the springs $k$.

The rockers $m$ receive their motion from cams $n$ rigid with an axially adjustable cam shaft $n'$ rotatably mounted within the body part of the unit parallel to the longitudinal axis thereof. The cam shaft is journalled in ball or roller bearings $n^2$ and is partly surrounded by a casing $n^3$ cast integral with the body part of the unit and adapted to form an oil bath for the cam shaft. The ends of the rockers for engaging the cams are provided with loosely fitted balls $o$ for the purpose of lessening friction between the rockers and the cam surfaces and more particularly during the axial adjusting movement of the cam shaft.

The cam shaft $n'$ is provided with eight cams $n$, two for steam admission and two for exhaust during forward running of the locomotive and the same number for the reverse running thereof. The exhaust cams are each of constant width, but the steam admission cams vary in width longitudinally, and this longitudinal variation is such that a range of cut-off varying from 2% to 80% is obtainable during both directions of travel of the locomotive.

The cam shaft $n'$ is preferably rotated by the driving wheels of the locomotive, and for this purpose is provided with a rigid extension $p$ (see Figure 1) having a squared end adapted to engage, and slide within, a correspondingly squared aperture in a transmission shaft $q$. A universal joint $r$ couples the transmission shaft $q$ with another shaft $s$ rigidly supporting a helical gear wheel $t$, and this wheel is adapted to engage another gear wheel $t'$ positively driven by the fly crank $u$ of the driving wheels of the locomotive. The cam shaft $n'$ is axially adjusted by means of a forked lever $p'$ rigid with a pivotal shaft $p^2$ adapted to be oscillated by the existing reversing rod or lever, the said forked lever $p'$ engaging a collar $p^3$ on the cam shaft extension $p$. As the cam shaft and its extension are slidably coupled to the transmission shaft $q$ they are capable of axial movement relatively thereto, such axial movement being effected by an oscillatory movement of the forked lever $p'$.

The adaptation of the steam distribution unit according to this invention to cylinders that would normally be provided with piston valves is effected by extracting the piston valves and their liners and restricting the steam passage in connection therewith, prior to suitably boring the piston valve housing for the insertion thereinto of the castings forming the body part of the unit.

In cylinders having piston valves large steam passages in the steam chest casings between the valves and the cylinders are necessary in consequence of the radial travel of the steam through the valves, and in some cases the capacity of such a passage is equal to 18% of the capacity of the cylinder.

By the use of the unit according to this invention, however, such a large steam passage in the steam chest casing is unnecessary when the unit is to be applied to a cylinder which would normally have a piston valve, and molten zinc is utilized to restrict the said passage, in fact the latter can be restricted so much that it has a capacity not exceeding 8% of the cylinder capacity. Such a restriction therefore effects a considerable saving in steam, especially superheated steam, and is shown diagrammatically in Figure 9, wherein $a^3$ indicates the zinc filling reducing the capacity in a steam passage $a^4$ of a cylinder $a^5$ which would normally have a piston valve.

The outer peripheral surfaces of the castings $a$ and $b$ are formed with a series of right-angled steps $b^4$ and $b^5$ of decreasing diameter towards the inner ends of the castings, which steps engage with corresponding seatings formed in the bore provided for receiving the castings. Copper wires $a^2$ are positioned in the seatings formed in the bore prior to the insertion of the castings, so that when the latter are forced into position steam-tight joints are at once effected between their outer peripheral surfaces and the adjacent surface of the bore.

Referring more particularly to Figure 5 of the drawings, steam admitted to the steam chest through the central aperture $v$ has direct access to the inlet valves positioned on the seatings $b$ and $b'$, and according to which inlet valve is in an open position the steam travels therefrom as shown by the arrows to the cylinder through either of the passages $b^2$ or $b^3$. The exhaust steam from the cylinder passes through the passages $c^2$ and $c^3$ to the exhaust valves positioned on the seatings $c$ and $c'$ and from thence passes to the blast pipe of the locomotive, thus having a shorter path.

To effect steam-tight joints between the valve seatings and their valve cages, copper wires $b^6$ are inserted in recesses in their cooperating surfaces.

To ensure freedom in drifting after the regulator is closed, the cam shaft is axially adjusted so that the cylindrical projections y thereon co-act with the valve rockers to maintain the valves in an open position so as to allow the free circulation of air to both sides of the piston and thereby eliminate the necessity for by-pass valves on the cylinders.

A modified construction of the unit according to the invention is illustrated in Figure 7 wherein the unit is shown as applied to a cylinder wherein the bore in the steam chest is insufficiently large to receive a unit housing the cam shaft in addition to the valves. In this case the valve spindles $i$ are extended by means of tappets $i'$ to project through both the body part of the unit and the steam chest casing, and the cam shaft $n'$ carrying the valves $n$ is adapted to rotate in a casing positioned on the outside of the said steam chest casing. The rockers $m$ for actuating the valves are pivotally supported by a lug integral with the cam shaft casing, and the motion of the cams is transmitted to the rockers through the medium of tappets $m'$ slidably mounted in extensions of the cam shaft casing. The tappets $m'$ are provided with loosely fitting balls $m^2$ for the purpose hereinbefore described.

In modified construction of the poppet valve illustrated in Figure 8, the lower terminating element $g^2$ of the valve cage is provided with a cylindrical cast iron extension $h'$ having labyrinths $h^2$ in its outer peripheral surface, which cylindrical extension is adapted to fit within a sleeve $h^3$ integral with the valve spindle $i$. This construction of poppet valve increases fluid-tightness between the valve spindle and the stationary cage.

Having now described my invention, what I claim as new and desire to secure by Letters Patent is:—

1. A poppet valve steam distribution unit for a locomotive or other engine, comprising in combination a tubular body-part independent of the engine cylinder, poppet valves located in cages detachably housed within said body-part and having seatings formed in the interior of the latter, passages controlled by said valves also formed in said body-part for steam admission and exhaust, pivotal transmission means for actuating said valves operatively associated with cams rigidly supported by a common rotatable shaft disposed parallel to the longitudinal axis of said body-part, and means for axially adjusting said shaft for the purpose described.

2. A poppet valve steam distribution arrangement for a locomotive or other engine, comprising in combination a body-part composed of two tubular castings which are independent of the engine cylinder and are rigidly connected together co-axially, poppet valves housed within said body-part and having transverse seatings formed in the interior of the latter, passages controlled by said valves also formed in said body-part for steam admission and exhaust, transmission means through which said valves are actuated by cams rigid with a common rotary cam shaft disposed within the said body-part parallel to the longitudinal axis thereof, and means whereby a pivotal lever co-operates with a collar on an extension of the cam shaft to axially adjust the latter for the purpose described.

3. In a poppet valve steam distribution unit as claimed in claim 1, double beat poppet valves each located within a cage composed of a series of superposed elements rigidly positioned co-axially with their valve seating in the body-part of the unit by means of a screw engaging both the said body-part and the upper terminating element of the cage.

4. In a poppet valve steam distribution unit as claimed in claim 1, double beat poppet valves each located within a cage composed of a series of superposed elements rigidly positioned co-axially with their valve seating in the body-part of the unit by means of a screw engaging both the said body-part and the upper terminating element of the cage, each such cage pivotally supporting a rocker having a loosely fitting ball for transmitting the motion of the cams to the valves.

5. In a poppet valve steam distribution unit as claimed in claim 1, double beat poppet valves each located within a cage composed of a series of superposed elements rigidly positioned co-axially with their valve seating in the body-part of the unit by means of a screw engaging both the said body-part and the upper terminating element of the cage, the lower terminating element of which cage is provided with a cylindrical extension having labyrinths in its outer peripheral surface and being adapted to fit within a sleeve integral with its valve spindle, each such cage pivotally supporting a rocker having a loosely fitting ball for transmitting the motion of the cams to the valves.

6. A poppet valve steam distribution arrangement for a locomotive engine, comprising in combination a body-part composed of two tubular castings which are independent of the engine cylinder and are rigidly connected together co-axially; poppet valves housed within said body-part and having seatings formed in the interior of the latter; passages controlled by said valves also formed in said body-part for steam admission and exhaust; transmission means through which said valves are actuated by cams rigid with a common cam shaft synchronously rotated by the driving wheels of the locomotive through the medium of a fly crank, helical gear wheels and universally jointed transmission shafts, in conjunction with an extension of the cam shaft; and means whereby said cam shaft is axially adjusted for the purpose described.

7. A poppet valve steam distribution unit for a locomotive or other engine, comprising in combination a tubular body-part independent of the engine cylinder, two poppet valves for steam admission and two for exhaust housed within said body-part and having seatings arranged in the interior of the latter parallel to the longitudinal axis thereof, passages controlled by said valves formed in said body-part for steam admission and exhaust, four cams for steam admission and four for exhaust, the exhaust cams being of constant width and the admission cams varying in width longitudinally, a common rotatable shaft rigidly carrying said cams arranged parallel to the longitudinal axis of said body-part, pivotal valve actuating members also housed within said body-part and operatively associated with said cams, and means for axially adjusting said shaft for the purpose described.

8. In a steam distribution unit as claimed in claim 1, a casing forming an oil bath for said camshaft longitudinally disposed within the body-part of the unit, and valve rockers pivotally mounted in the interior of said body-part upon lugs rigid with the valve cages.

In testimony whereof I have signed my name to this specification.

JACQUES MOUCHLY.